United States Patent
Chaganti et al.

(10) Patent No.: US 11,126,964 B2
(45) Date of Patent: Sep. 21, 2021

(54) METHOD AND SYSTEM FOR DYNAMIC AUTO-GENERATION OF UP-TO-DATE DEPLOYMENT AND OPERATIONS GUIDANCE FOR SOLUTIONS

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 15/963,184

(22) Filed: Apr. 26, 2018

(65) Prior Publication Data

US 2019/0333018 A1    Oct. 31, 2019

(51) Int. Cl.
*G06Q 10/08* (2012.01)
*G06F 16/22* (2019.01)

(52) U.S. Cl.
CPC ..... *G06Q 10/0875* (2013.01); *G06F 16/2255* (2019.01)

(58) Field of Classification Search
CPC ............................... G06F 17/50; G06Q 10/00
USPC ......................................................... 705/29
See application file for complete search history.

(56) References Cited

U.S. PATENT DOCUMENTS

| | | | | |
|---|---|---|---|---|
| 5,920,873 A * | 7/1999 | Huben | ................... | G06Q 10/04 |
| 6,701,345 B1 * | 3/2004 | Carley | ................... | G06F 16/252 709/205 |
| 6,904,449 B1 * | 6/2005 | Quinones | ............... | G06Q 10/10 709/203 |
| 7,403,901 B1 * | 7/2008 | Carley | .................. | G06F 16/258 705/2 |
| 7,865,888 B1 * | 1/2011 | Qureshi | ................ | G06F 11/079 717/168 |
| 8,121,874 B1 * | 2/2012 | Guheen | ................ | G06Q 10/063 705/7.11 |
| 2002/0049749 A1 * | 4/2002 | Helgeson | ............ | G06F 21/6236 709/203 |
| 2002/0073080 A1 * | 6/2002 | Lipkin | ................ | G06F 16/9535 |
| 2002/0073236 A1 * | 6/2002 | Helgeson | .............. | G06F 16/258 709/246 |
| 2002/0138316 A1 * | 9/2002 | Katz | .................. | G06Q 30/0202 705/7.13 |

(Continued)

OTHER PUBLICATIONS

Whei-Jen Chen, Implementing an InfoSphere Optim Data Growth Solution, Nov. 9, 2011 An IBM Redbooks publication ISBN-10: 0738436135 (Year: 2011).*

*Primary Examiner* — Oluseye Iwarere

(74) *Attorney, Agent, or Firm* — Chamberlain, Hrdlicka, White, Williams & Aughtry

(57) ABSTRACT

A method and system for dynamic auto-generation of up-to-date deployment and operations guidance for solutions. Specifically, the method and system disclosed herein entail providing guidance tailored to a combination of components and/or subcomponents constituting a specific solution infrastructure. Further, the guidance accounts for deployment and operations cycle (DOC) stages, as well as configuration dependencies, when sequencing configuration steps relevant to the specific solution infrastructure.

18 Claims, 14 Drawing Sheets

(56) References Cited

U.S. PATENT DOCUMENTS

| | | | | |
|---|---|---|---|---|
| 2002/0174000 A1* | 11/2002 | Katz | G06Q 10/087 | 705/7.26 |
| 2002/0178077 A1* | 11/2002 | Katz | G06Q 10/10 | 705/7.36 |
| 2003/0033179 A1* | 2/2003 | Katz | G06Q 10/0639 | 705/7.12 |
| 2003/0037173 A1* | 2/2003 | Pace | H04L 67/2823 | 719/310 |
| 2003/0051236 A1* | 3/2003 | Pace | H04L 67/34 | 717/177 |
| 2003/0078958 A1* | 4/2003 | Pace | G06F 9/544 | 709/201 |
| 2003/0084134 A1* | 5/2003 | Pace | H04L 69/40 | 709/223 |
| 2004/0015408 A1* | 1/2004 | Rauen, IV | G06Q 30/0613 | 705/26.41 |
| 2004/0025157 A1* | 2/2004 | Blight | G06F 8/61 | 717/174 |
| 2006/0047974 A1* | 3/2006 | Alpern | G06F 9/44521 | 713/191 |
| 2006/0235771 A1* | 10/2006 | Oberoi | G06Q 20/401 | 705/29 |
| 2009/0271372 A1* | 10/2009 | Fife | G06F 16/2452 | |
| 2013/0091252 A1* | 4/2013 | Pizzorni | H04L 69/329 | 709/219 |
| 2014/0149492 A1* | 5/2014 | Ananthanarayanan | G06F 9/5072 | 709/203 |
| 2014/0229335 A1* | 8/2014 | Chen | G06Q 30/0269 | 705/26.61 |
| 2016/0191298 A1* | 6/2016 | Markley | H04L 41/12 | 709/223 |
| 2017/0068931 A1* | 3/2017 | Chaganti | G06Q 10/0875 | |
| 2018/0131765 A1* | 5/2018 | Puleston | G06K 7/10366 | |

* cited by examiner

| Solution Bill of Materials (BOM) 620 | | | |
|---|---|---|---|
| Item No. | Qty. | SKU | Description |
| 1 | 1 | C1xx1 | Component C1-1 |
| 2 | 1 | C1x11 | Subcomponent C1-1-1 |
| 3 | 1 | C1x12 | Subcomponent C1-1-2 |
| ••• | ••• | ••• | ••• |
| 29 | 1 | C3xx2 | Component C3-2 |
| 30 | 1 | C3x21 | Subcomponent C3-2-1 |
| 31 | 1 | C3x22 | Subcomponent C3-2-2 |
| 32 | 1 | C3x23 | Subcomponent C3-2-3 |
| 33 | 1 | C3x24 | Subcomponent C3-2-4 |

*FIG. 6B*

```
{
    "ProductName" : "Mellanox Connect-X 3 Pro",
    "DellPN" : "XY123",
    "PreDeploy" : [
        {
            "StepID" : "MLNX-PRED-FW_UPDATE",
            "Type": "Update",
            "Instructions" : [
                {
                    "UpdateiDRACUI" : {
                        "description" : "Steps to Update the firmware on a Mellanox CX3 Pro Network Adapter via iDRAC web UI",
                        "sectionTitle" : "Mellanox Firmware Update (GUI)",
                        "Steps" : "1. Login to iDRAC web console.\n 2. Navigate to Maintenance -> System Update.\n 3. Click on choose file and select the path to the DUP file and Click Upload.\n 4. Select the uploaded DUP and click Install.",
                        "DependsOn" : "MLNX-PRED-FW_VALIDATE"
                    }, "UpdateiDRACPowerShell" : {
                        "description" : "Steps to Update the firmware on a Mellanox CX3 Pro Network Adapter via PowerShell Tools",
                        "sectionTitle" : "Mellanox Firmware Update (PowerShell)",
                        "Steps" : "$Session = New-PEDRACSession -IPAddress <DRAC> -Credential <Cred>;Update-PEComponent -iDRACSession $Session -FQDD <NIC.SLOT.1.1> -DUP <PathtoDUPFile>",
                        "DependsOn" : "MLNX-PRED-FW_VALIDATE"
                    }
                }
            ]
        },
        {
            "StepID" : "MLNX-PRED-FW_VALIDATE",
            "Type": "Validation",
            "Instructions" : [
                {
                    "ValidateFWPowerShell" : {
```

*FIG. 6G*

```
                    "description" : "Steps to validate the firmware version
on a Mellnox CX3 Pro Network Adapter via PowerShell Tools",
                    "sectionTitle" : "Mellanox Firmware Validation
(PowerShell)",
                    "Steps" : "$Session = New-PEDRACSession -IPAddress <DRAC>
-Credential <Cred>;Test-PEComponent -iDRACSession $Session -FQDD <NIC.SLOT.1.1> -
Version <VersionString>"
                  }
                }
              ]
            }
        ],
        "Deploy" : [
          {
            "StepID" : "MLX-DEP-DRV_INSTALL",
            "Type" : "Install",
            "Instructions" : [
              {
                "InstallDrvOS" : {
                  "description" : "Steps to Install the Mellnox CX3 Pro
Network Adapter driver using DUP in OS",
                  "sectionTitle" : "Mellanox Driver install (OS)",
                  "Steps" : "1. Copy the DUP file to a temporary location
on the local disk./n 2. Execute the DUP file and answer on screen prompts./n 3.
You may be prompted for a restart at the end of install."
                }
              }
            ]
          }
        ]
      }
}
```

*FIG. 6H*

METHOD AND SYSTEM FOR DYNAMIC AUTO-GENERATION OF UP-TO-DATE DEPLOYMENT AND OPERATIONS GUIDANCE FOR SOLUTIONS

BACKGROUND

Information technology solutions, by design, provide flexibility in solution infrastructure components and, therefore, are provided in different configuration options to tackle different usage scenarios. Often, however, despite this flexibility for tailoring solution infrastructures to the needs of customers, guidance presented for deploying and/or operating these tailored solution infrastructures continue to follow the static, one-fits-all model.

BRIEF DESCRIPTION OF DRAWINGS

FIG. 6B shows an example solution bill of materials in accordance with one or more embodiments of the invention.

FIG. 6F shows a configuration step sequence in accordance with one or more embodiments of the invention.

FIGS. 6G and 6H show an example solution infrastructure guidance in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for dynamic auto-generation of up-to-date deployment and operations guidance for solutions. Specifically, one or more embodiments of the invention entail providing guidance tailored to a combination of components and/or subcomponents constituting a specific solution infrastructure. Further, the guidance accounts for deployment and operations cycle (DOC) stages, as well as configuration dependencies, when sequencing configuration steps relevant to the specific solution infrastructure.

Figure 1:
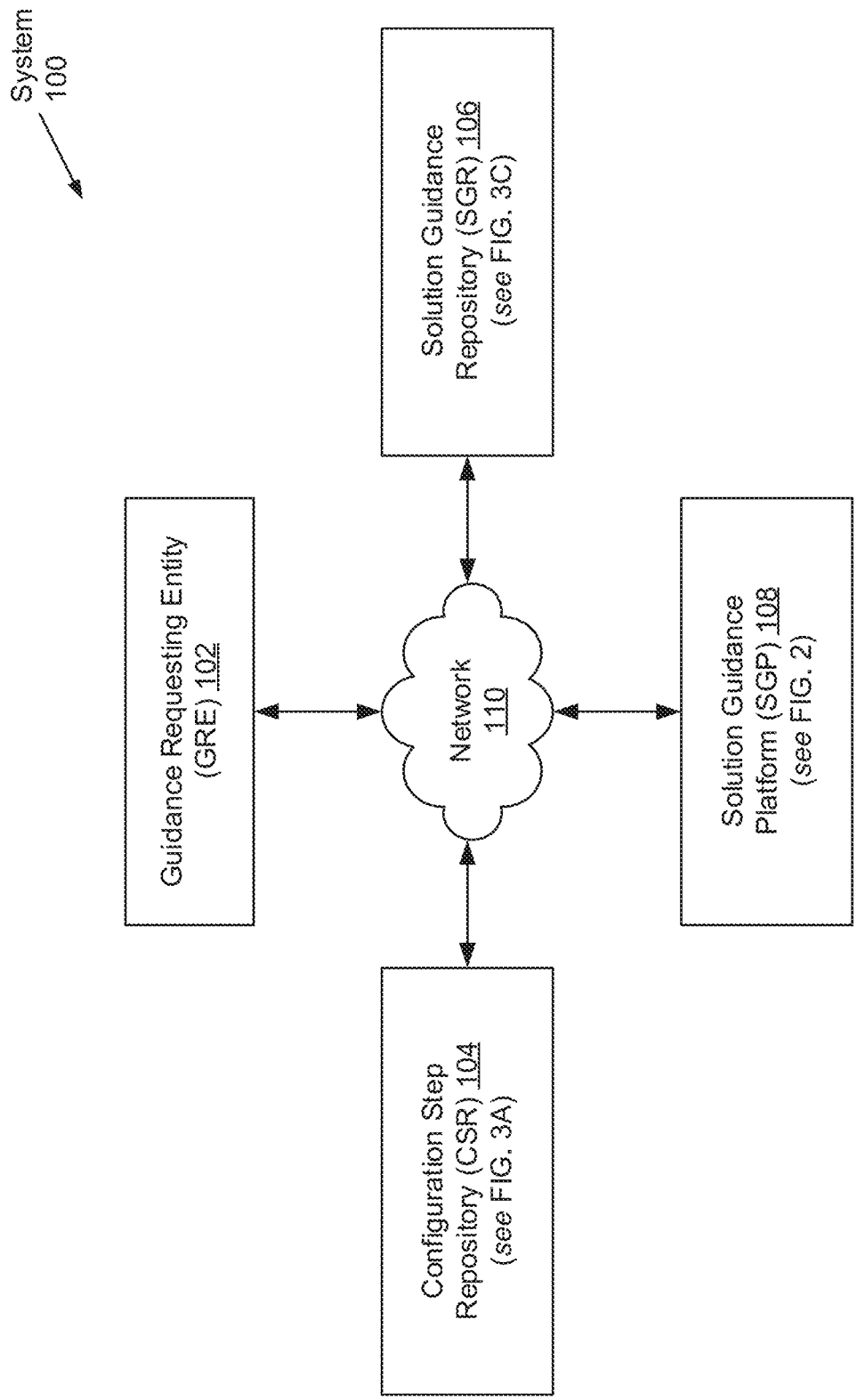
FIG. 1 shows a system in accordance with one or more embodiments of the invention.

FIG. 1 shows a system in accordance with one or more embodiments of the invention. The system (100) includes a guidance requesting entity (GRE) (102), a configuration step repository (CSR) (104), a solution guidance repository (SGR) (106), and a solution guidance platform (SGP) (108). Each of these components is described below.

In one embodiment of the invention, the aforementioned components may be directly or indirectly connected to one another through a network (110) (e.g., a local area network (LAN), a wide area network (WAN) such as the Internet, a mobile network, or any other network). The network (110) may be implemented using any combination of wired and/or wireless connections. In embodiments in which the aforementioned components are indirectly connected, there may be other networking components or systems (e.g., switches, routers, gateways, etc.) that facilitate communications and/or information exchange. Further, the aforementioned components may communicate with one another using any combination of wired and/or wireless communication protocols.

In one embodiment of the invention, the GRE (102) may be any computing system (see e.g., FIG. 5) that includes functionality to submit requests, pertaining to deployment and/or operations guidance for solutions, to the SGP (108). A solution, also disclosed herein as solution infrastructure, may refer to a particular configuration of various information technology (IT) components (e.g., servers, storage, networking, management, etc.) designed to service a specific usage scenario. Henceforth, deployment guidance for a solution may refer to detailed, ordered instructions for interconnecting, installing, and configuring the solution infrastructure, as well as any associated software. Meanwhile, operations guidance for a solution may refer to detailed, ordered instructions for operating, managing, and maintaining the solution infrastructure and any associated software.

In one embodiment of the invention, the GRE (102) may include further functionality to provide solution bill of materials (BOMs), via the above-mentioned requests, to the SGP (108). A solution BOM may be a data object or structure representative of a comprehensive list of all components and their respective subcomponents that constitute a solution/solution infrastructure. A component of a solution may refer to a physical device that enables some functionality of the solution. Examples of components include, but are not limited to, servers, network devices (e.g., switches, routers, etc.), storage arrays, power source and/or distribution units (PSUs/PDUs), etc. On the other hand, a subcomponent of a component may refer to a subassembly of the component. Examples of subcomponents include, but are not limited to, central processing unit (CPU) chips, read-only memory (ROM), random access memory (RAM), small computer system interface (SCSI) controllers, hard disk drives (HDDs), solid state drives (SSDs), sound cards, network adapters, etc.

In one embodiment of the invention, the GRE (102) may include further functionality to receive responses, addressing the above-mentioned requests pertaining to deployment and/or operations guidance for solutions, from the SGP (108). The response(s) may include deployment guidance (described above), operations guidance (described above), or a combination thereof, for one or more solution infrastructures. In one embodiment of the invention, the GRE (102) may be operated by administrators of a solution infrastructure. Examples of the GRE (102) include, but are not limited to, a desktop computer, a laptop computer, a tablet computer, a server, a mainframe, a smartphone, any other computing system (see e.g., FIG. 5), or any combination thereof.

In one embodiment of the invention, the CSR (104) may be a storage system or medium for consolidating configuration step instructions (described below). The CSR (104) may be implemented using any type of storage unit and/or device (e.g., a filesystem, a database, a collection of tables, or any other storage mechanism). Further, the CSR (104) may be implemented using multiple storage units and/or devices, which may or may not be of the same type or located at the same physical site. In one embodiment of the invention, the CSR (104) may be implemented using persistent (i.e., non-volatile) storage media. Examples of persistent storage media include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). The CSR (104) is described in further detail below with respect to FIG. 3A.

In one embodiment of the invention, the SGR (106) may be a storage system or medium for consolidating deployment and/or operations guidance (described above) for one or more solution infrastructures. The SGR (106) may be implemented using any type of storage unit and/or device (e.g., a filesystem, a database, a collection of tables, or any other storage mechanism). Further, the SGR (106) may be implemented using multiple storage units and/or devices, which may or may not be of the same type or located at the same physical site. In one embodiment of the invention, the SGR (106) may be implemented using persistent (i.e., non-volatile) storage media. Examples of persistent storage media include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). The SGR (106) is described in further detail below with respect to FIG. 3C.

In one embodiment of the invention, the SGP (108) may be a solution deployment and/or operations guidance service. The SGP (108) may be implemented on one or more servers (not shown). Each server may be a physical server (i.e., residing in a datacenter) or a virtual server (i.e., which may be cloud-based). In another embodiment of the invention, the SGP (108) may be implemented on one or more computing systems similar to the exemplary computing system shown in FIG. 5. Furthermore, the SGP (108) may include functionality to: receive solution guidance requests (i.e., requests pertaining to deployment guidance and/or operations guidance for solution infrastructures) from the GRE (102); process solution BOMs (described above), obtained via the aforementioned requests, to generate (or otherwise obtain) deployment and/or operations guidance for all components and subcomponents in the solution infrastructure(s); and as replies to the requests, provide the generated or obtained deployment and/or operations guidance, for solution infrastructures, back to the GRE (102). The SGP (108) is described in further detail below with respect to FIG. 2.

While FIG. 1 shows a configuration of components, other system configurations may be used without departing from the scope of the invention. For example, the CSR (104) and/or the SGR (106) may be integrated as subcomponents of the SGP (108) rather than being external entities that are operatively connected to the SGP (108).

Figure 2:
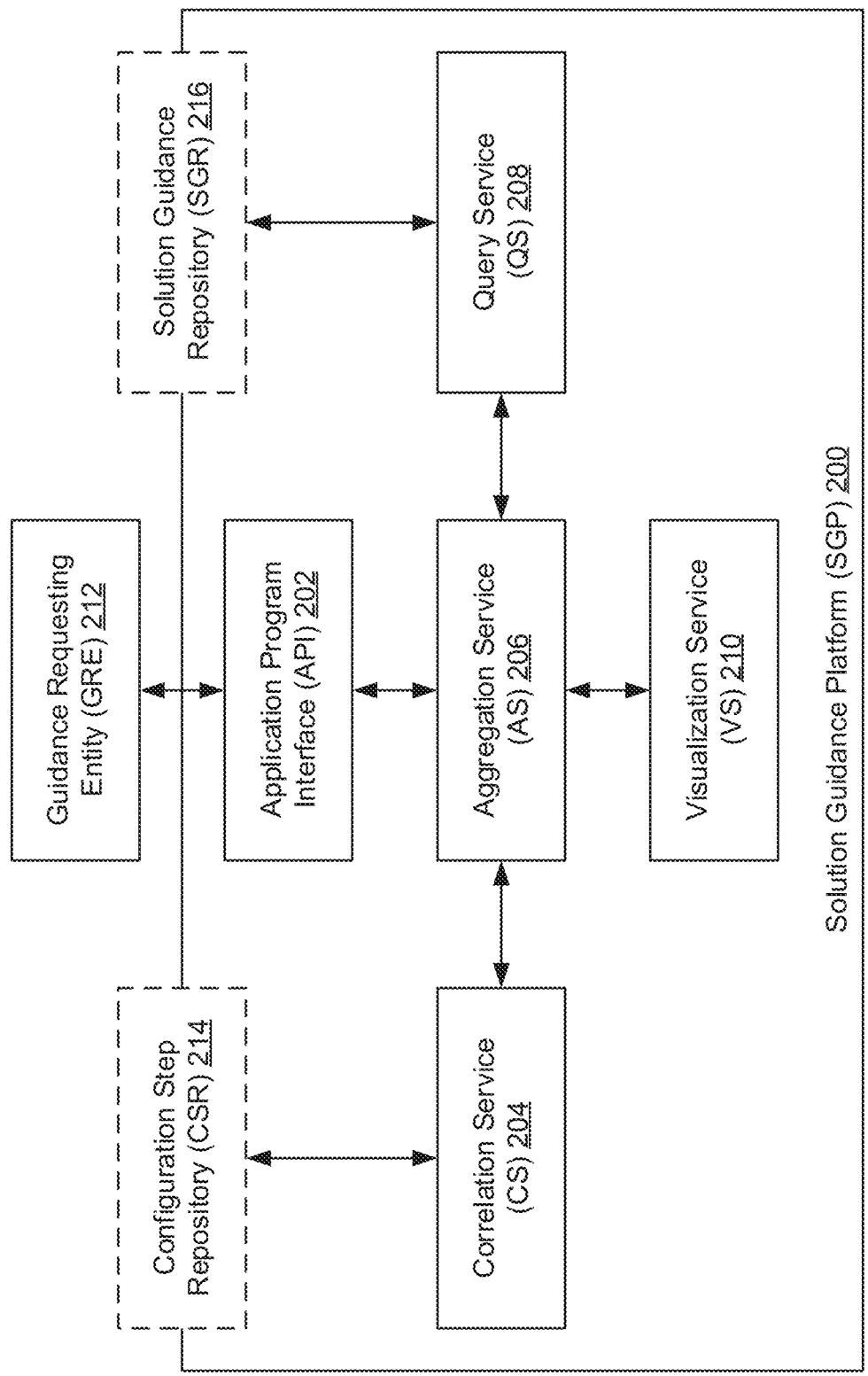
FIG. 2 shows a solution guidance platform in accordance with one or more embodiments of the invention.

FIG. 2 shows a solution guidance platform (SGP) in accordance with one or more embodiments of the invention. As described above, the SGP (200) may be a solution (i.e., solution infrastructure) deployment and/or operations guidance service. To that end, in one embodiment of the invention, the SGP (200) includes an application programming interface (API) (202), a correlation service (CS) (204), an aggregation service (AS) (206), a query service (QS) (208), and a visualization service (VS) (210). Further, in one embodiment of the invention, the configuration step repository (CSR) (214) and/or the solution guidance repository (SGR) (216) may reside externally to the SGP (200), however, remain operatively connected to the SGP (200). In another embodiment of the invention, the CSR (214) and/or the SGR (216) may reside internally within the SGP (200). Each of these components is described below.

In one embodiment of the invention, the API (202) may be a hardware and/or software implemented construct that employs a set of subroutine definitions, protocols, and/or tools for enabling information exchange between the SGP (200) and one or more external entities (e.g., a guidance requesting entity (GRE) (212) (described above), the CSR (214), and/or the SGR (216)). For example, the API (202) may establish that the exchange of information may entail a request for processing, and a return of a response, if any, based on the outcome of the processing. In one embodiment of the invention, the API (202) may be a web API accessed through an assigned web address (e.g., a uniform resource locator (URL)) and a WAN (e.g., Internet) connection.

In one embodiment of the invention, the CS (204) may be one or more computer programs, or computer processes (i.e., an instances of a computer program), that execute on the underlying hardware of the SGP (200). Specifically, the CS (204) may be computer programs or processes that are collectively tasked with obtaining relevant guidance step-by-step instructions for deploying and/or operating one or more components and subcomponents. Substantively, the CS (204) may include functionality to: (i) obtain solution component information (SCI) (described below) from the AS (206); (ii) access the CSR (214) to perform lookups therein using any obtained SCI; (iii) based on the lookups, retrieve step instructions across various stages of deployment and/or operations guidance for one or more components and/or subcomponents; and (iv) provide the retrieved step instructions to the AS (206). The CS (204) may be tasked with performing other functionalities without departing from the scope of the invention.

In one embodiment of the invention, the AS (206) may be one or more computer programs, or computer processes (i.e., instances of a computer program), that execute on the underlying hardware of the SGP (200). Specifically, the AS (206) may be computer programs or processes that are collectively tasked with overseeing overall operations of the SGP (200) and coordination between the other services (i.e., the CS (204), the QS (208), and the VS (210)). Substantively, the AS (206) may include functionality to: (i) receive guidance requests, via the API (202), from one or more GREs (212); (ii) extract solution component information (SCI) from solution BOMs specified in the guidance requests; (iii) provide SCI to the QS (208); (iv) obtain solution infrastructure guidance, if found in the SGR (216), from the QS (208); (v) provide SCI to the CS (204); (vi) obtain guidance relevant step instructions for one or more components and/or subcomponents from the CS (204); (vii) generate solution infrastructure guidance using any obtained step instructions; and (viii) provide any solution infrastructure guidance, either generated or obtained, back to one or more GREs (212) via the API (202). With respect to the solution infrastructure guidance, the AS (206) may include further functionality to optimize the guidance to ensure unnecessary repetition of instructions for similar components/subcomponents. The AS (206) may be tasked with performing other functionalities without departing from the scope of the invention.

In one embodiment of the invention, the QS (208) may be one or more computer programs, or computer processes (i.e., instances of a computer program), that execute on the underlying hardware of the SGP (200). Specifically, the QS (208) may be computer programs or processes that are collectively tasked with obtaining solution infrastructure guidance, if any has already been auto-generated and catalogued. Substantively, the QS (208) may include functionality to: (i) obtain SCI from the AS (206); (ii) derive guidance identifiers (IDs) using the SCI; (iii) access the SGR (216) to perform lookups therein using any derived guidance IDs; (iv) based on the lookups, determine whether existing solution infrastructure guidance associated with the guidance IDs have already been auto-generated and catalogued; and (v) provide any existing solution infrastructure guidance to the AS (206) or, alternatively, inform the AS (206) that no previously auto-generated guidance associated with specified guidance IDs exist. The QS (208) may be tasked with performing other functionalities without departing from the scope of the invention.

In one embodiment of the invention, the VS (210) may be one or more computer programs, or computer processes (i.e., instances of a computer program), that execute on the underlying hardware of the SGP (200). Specifically, the VS (210) may be computer programs or processes that are collectively tasked with encoding any requested deployment and/or operations guidance into one or more presentation formats. Substantively, the VS (210) may include functionality to: (i) obtain solution infrastructure guidance from the AS (206), where the obtained solution infrastructure guidance may be expressed in an initial format (e.g., JavaScript Object Notation (JSON)); (ii) encode the solution infrastructure guidance to be expressed in one or more final formats (e.g., HyperText Markup Language (HTML), Adobe Portable Document Format (PDF), Microsoft Word Open Extensible Markup Language (XML) Format Document (DOCX)); and (iii) provide the encoded solution infrastructure guidance back to the AS (206). The VS (210) may be tasked with performing other functionalities without departing from the scope of the invention.

Figure 3A:
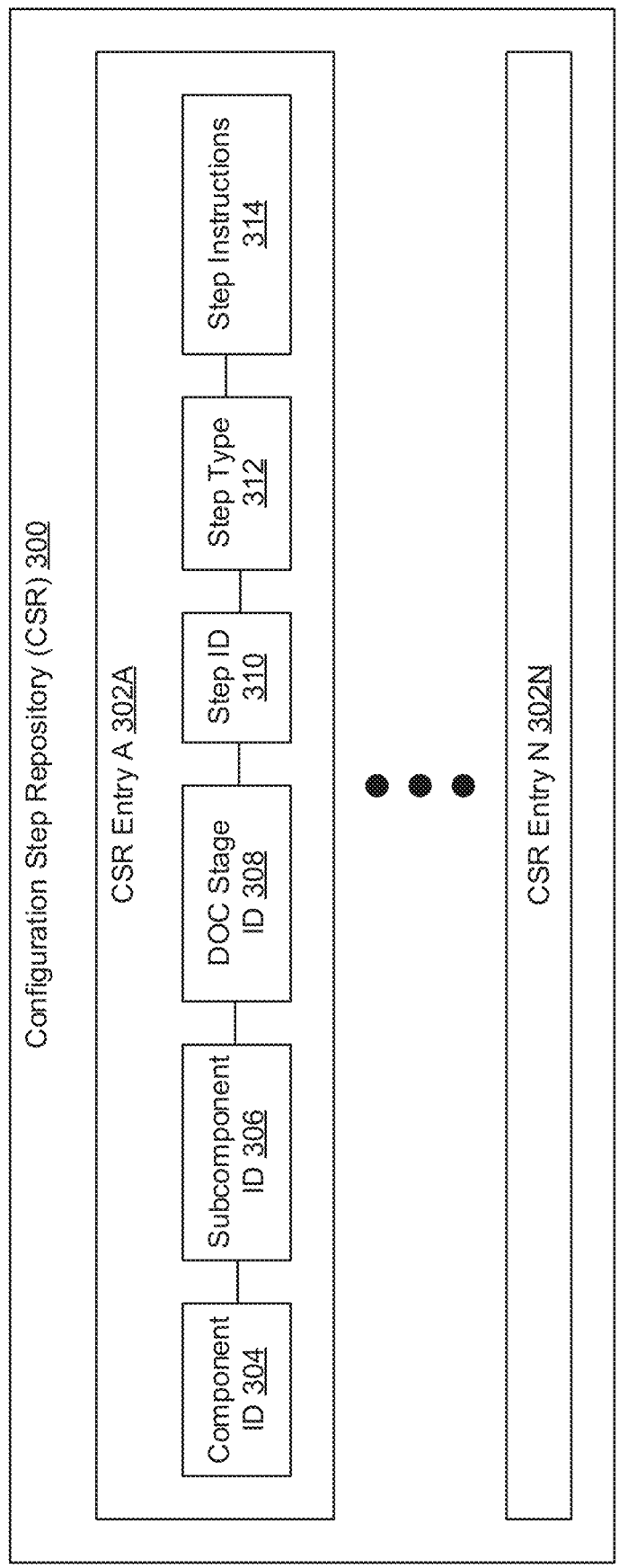
FIG. 3A shows a configuration step repository in accordance with one or more embodiments of the invention.

FIG. 3A shows a configuration step repository (CSR) in accordance with one or more embodiments of the invention. As described above, the CSR (300) may be a storage system or medium for consolidating configuration step instructions. In one embodiment of the invention, information stored in the CSR (300) may be maintained (i.e., added, removed, and/or updated) by administrators of the CSR (300) and/or the solution guidance platform (SGP). Any changes to the information stored in the CSR (300) may reflect upon design, deployment, and/or operational changes to one or more components and/or subcomponents constituting one or more solution infrastructures. In one embodiment of the invention, the information stored in the CSR (300) may be logically organized into one or more CSR entries (302A-302N). Each CSR entry (302A-302N) may be a data container within which various related items of information reside. These related items of information include a component identifier (ID) (304), a subcomponent ID (306), a deployment and operations cycle (DOC) stage ID (308), a step ID (310), a step type (312), and one or more step instructions (314). Each of these items of information is described below.

In one embodiment of the invention, the component ID (304) may be a string of characters (e.g., letters, numbers, symbols, etc.) that may be used to uniquely identify a component of a solution infrastructure. As described above, a component of a solution (or solution infrastructure) may refer to a physical device that enables some functionality of the solution. Examples of components include, but are not limited to, servers, network devices (e.g., switches, routers, etc.), storage arrays, power source and/or distribution units (PSUs/PDUs), etc. Further, the component ID (304) may entail any number and/or combination of characters. By way of an example, the component ID (304) may be represented through an alphanumeric tag or a N-bit integer (where N>0) expressed in hexadecimal notation. In one embodiment of the invention, the component ID (304) may be a stock keeping unit (SKU) identification code assigned to the component.

In one embodiment of the invention, the subcomponent ID (306) may be a string of characters (e.g., letters, numbers, symbols, etc.) that may be used to uniquely identify a subcomponent of a solution infrastructure. As described above, a subcomponent may refer to a subassembly of a component. Examples of subcomponents include, but are not limited to, central processing unit (CPU) chips, read-only memory (ROM), random access memory (RAM), small computer system interface (SCSI) controllers, hard disk drives (HDDs), solid state drives (SSDs), sound cards, network adapters, etc. Further, the subcomponent ID (306) may entail any number and/or combination of characters. In one embodiment of the invention, the subcomponent ID (306) may or may not resemble, or be based on, the component ID (304) corresponding to the component with which the subcomponent is associated. By way of an example, the subcomponent ID (306) may be represented through an alphanumeric tag or a N-bit integer (where N>0) expressed in hexadecimal notation. In one embodiment of the invention, the subcomponent ID (306) may be a stock keeping unit (SKU) identification code assigned to the subcomponent.

Figure 3B:
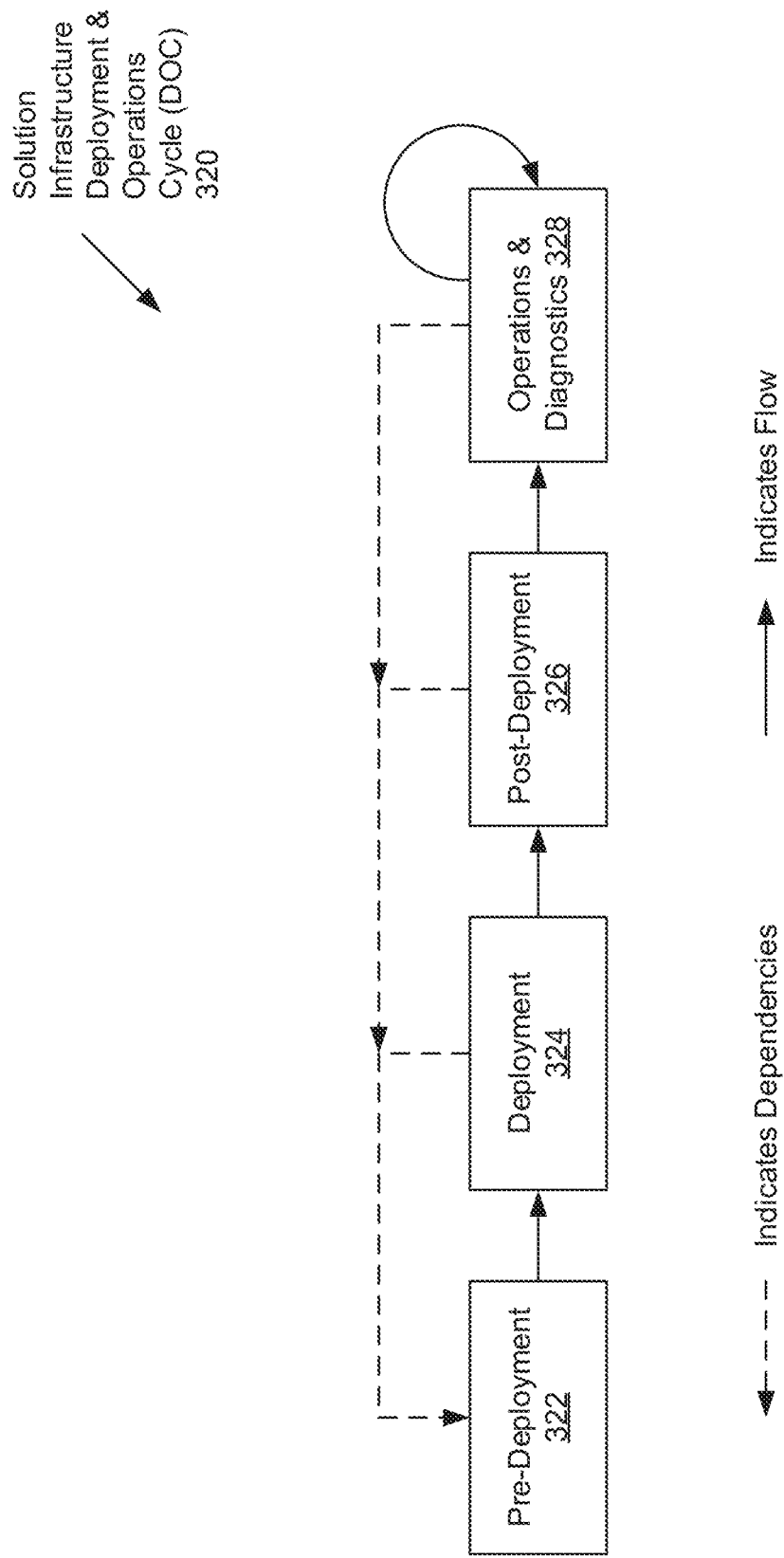
FIG. 3B shows an example solution infrastructure deployment and operations cycle in accordance with one or more embodiments of the invention.

In one embodiment of the invention, the DOC stage ID (308) may be a string of characters (e.g., letters, numbers, symbols, etc.) that may be used to uniquely identify a stage or phase in a solution infrastructure deployment and/or operations cycle (DOC) (see e.g., FIG. 3B). Substantively, the DOC stage ID (308) corresponds to a stage along the DOC in which the one or more step instructions (312), also specified in the CSR entry (302A-302N), are to be executed. Further, the DOC stage ID (308) may entail any number and/or combination of characters. By way of an example, the deployment stage ID (308) may be represented through an alphanumeric tag or a N-bit integer (where N>0) expressed in hexadecimal notation.

In one embodiment of the invention, the step ID (310) may be a string of characters (e.g., letters, numbers, symbols, etc.) that may be used to uniquely identify a configuration step. A configuration step may pertain to a process, entailing one or more tasks which, when executed in a presented order, configures a component and/or subcomponent of a solution/solution infrastructure. Further, the configuration step may pertain to deploying and/or operating the component and/or subcomponent. Moreover, the step ID (310) may entail any number and/or combination of characters. By way of an example, the step ID (310) may be represented through an alphanumeric tag or a N-bit integer (where N>0) expressed in hexadecimal notation.

In one embodiment of the invention, the step type (312) may refer to a classification associated with a configuration step. The classification may direct to a purpose or objective that may be achieved through execution of the configuration step. For example, the step type (312) may indicate that a configuration step is directed to an update (e.g., the updating of firmware on a component and/or subcomponent). By way of another example, the step type (312) may indicate that a configuration step is directed to a validation (e.g., the validating of a firmware version on a component and/or subcomponent). By way of yet another example, the step type (312) may indicate that a configuration step is directed to an installation (e.g., the installing of a device driver for a component and/or subcomponent).

In one embodiment of the invention, the step instruction(s) (314) may refer to an ordered series of detailed information directing how execution of a configuration step should be performed. The step instruction(s) (314) may be expressed as a human-comprehensive instruction (e.g., "Login to web console") or, alternatively, as a pseudo command line interface (CLI) instruction (e.g., "$Session=New-PEDRACSession-IPAddress<DRAC>-Credential<Cred>;"). In one embodiment of the invention, the step instruction(s) (314) may further specify one or more configuration dependencies. A configuration dependency may refer to a prerequisite configuration step that needs to be performed prior to execution of the current configuration step (i.e., the configuration step associated with the step ID (310) and, subsequently, the CSR entry (302A-302N)). The prerequisite configuration step may pertain to the component and/or subcomponent associated with the component ID (304) and/or subcomponent ID (306), respectively, or, alternatively, the prerequisite configuration step may pertain to another component and/or subcomponent.

FIG. 3B shows an example solution infrastructure deployment and operations cycle (DOC) in accordance with one or more embodiments of the invention. A solution infrastructure DOC (320), which may also be disclosed herein simply as a DOC, may specify the stages of configuration through which a solution infrastructure would need to undergo to be rendered completely functional. The example DOC (320) includes four stages, however, one of ordinary skill will appreciate that other DOCs could specify more or less stages. The four stages portrayed in FIG. 3B include a pre-deployment stage (322), a deployment stage (324), a post-deployment stage (326), and an operations and diagnostics stage (328). Each of these stages is described below.

In one embodiment of the invention, the pre-deployment stage (322) may entail configuration steps directed to pre-operating system (OS) and bare metal configuration. Substantively, the involved configuration steps may be achieved either manually or as an automated process that employs tools and/or scripts. Examples of configurations steps that may be executed during the pre-deployment stage (322) include, but are not limited to: firmware updates, basic input/output system (BIOS) configurations, top-of-rack (TOR) configurations, redundant array of independent disks (RAID) and/or network host bus adapter (HBA) pre-OS configurations, storage fabric configurations, and peripherals configuration. Moreover, in one embodiment of the invention, any configuration step to be performed during the pre-deployment stage (322) may be associated with one or more configuration dependencies, where the configuration dependencies may reference to other configuration steps of the pre-deployment stage (322).

In one embodiment of the invention, the deployment stage (324) may entail configuration steps directed to OS and/or hypervisor configuration. Substantively, the involved configuration steps may largely be generic across various solution infrastructures, however, a subset of the configuration steps may be specific to a given solution bill of materials (BOM) representative of the components and/or subcomponents of a solution infrastructure. Examples of configuration steps that may be executed during the deployment stage (324) include, but are not limited to: OS installations, host network configurations, directory services configurations, storage mapping, and cluster creation and configurations. Moreover, in one embodiment of the invention, any configuration step to be performed during the deployment stage (324) may be associated with one or more configuration dependencies, where the configuration dependencies may reference to other configuration steps of the pre-deployment and/or deployment stages (322, 324).

In one embodiment of the invention, the post-deployment stage (326) may entail configuration steps directed to systems management and monitoring configuration. Substantively, the involved configuration steps may include aspects that may be optional. Examples of configuration steps that may be executed during the post-deployment stage (326) include, but are not limited to: systems management configurations, systems monitoring configurations, and customer specific network artifacts configurations. Moreover, in one embodiment of the invention, any configuration step to be performed during the post-deployment stage (326) may be associated with one or more configuration dependencies, where the configuration dependencies may reference to other configuration steps of the pre-deployment, deployment, and/or post-deployment stages (322, 324, 326).

In one embodiment of the invention, the operations and diagnostics stage (328) may entail configuration steps directed to active functioning of the solution infrastructure and its maintenance. Examples of configuration steps that may be executed during the operations and diagnostics stage (328) include, but are not limited to: firmware updates, cluster node expansions, component and/or subcomponent troubleshooting, and further solution infrastructure monitoring. Moreover, in one embodiment of the invention, any configuration step to be performed during the operations and diagnostics stage (328) may be associated with one or more configuration dependencies, where the configuration dependencies may reference to other configuration steps of the pre-deployment, deployment, post-deployment, and/or operations and diagnostics stages (322, 324, 326, 328).

Figure 3C:
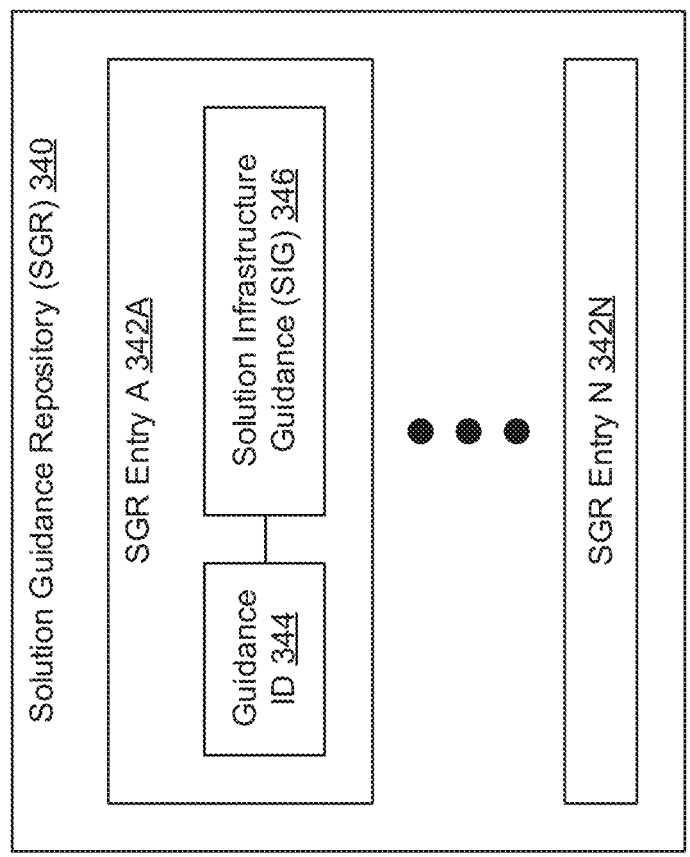
FIG. 3C shows a solution guidance repository in accordance with one or more embodiments of the invention.

FIG. 3C shows a solution guidance repository (SGR) in accordance with one or more embodiments of the invention. As described above, the SGR (340) may be a storage system or medium for consolidating deployment and/or operations guidance for one or more solution infrastructures. The deployment and/or operations guidance consolidated in the SGR (340) may pertain to guidance that had previously been auto-generated based on prior guidance requests. In one embodiment of the invention, information stored in the SGR (340) may be maintained (i.e., added, removed, and/or updated) by the aggregator service (AS) and/or the query service (QS) of the solution guidance platform (SGP) (see e.g., FIG. 2). Any changes to the information stored in the SGR (340) may reflect upon design, deployment, and/or operational changes to one or more components and/or subcomponents constituting one or more solution infrastructures. In one embodiment of the invention, the information stored in the SGR (340) may be logically organized into one or more SGR entries (342A-342N). Each CSR entry (342A-342N) may be a data container within which various related items of information reside. These related items of information include a guidance identifier (ID) (344) and a solution infrastructure guidance (SIG) (346). Each of these items of information is described below.

In one embodiment of the invention, the guidance ID (344) may be a string of characters (e.g., letters, numbers, symbols, etc.) that may be used to uniquely identify the SIG (346) (described below). The guidance ID (344) may entail any number and/or combination of characters. By way of an example, the guidance ID (344) may be represented through an alphanumeric tag or a N-bit integer (where N>0) expressed in hexadecimal notation. In one embodiment of the invention, the guidance ID (344) may be a hash of all component and/or subcomponent identifiers (e.g., stock keeping units (SKUs)) associated with all components and/or subcomponents constituting a solution/solution infrastructure.

In one embodiment of the invention, the SIG (346) may pertain to deployment guidance for a solution infrastructure, operations guidance for the solution infrastructure, or both. As described above, deployment guidance may refer to detailed, ordered instructions for interconnecting, installing, and configuring the solution infrastructure, as well as any associated software. Meanwhile, operations guidance may refer to detailed, ordered instructions for operating, managing, and maintaining the solution infrastructure and any associated software. Further, the SIG (346) may encompass various configuration steps (described above) (see e.g., FIG. 3A) directed to one or more components and/or subcomponents of a solution infrastructure which, further, span across one or more stages of a deployment and operations cycle (DOC) (see e.g., FIG. 3B). In one embodiment of the invention, the SIG (346) may be expressed, and thus stored, in any data-interchange format (e.g., JavaScript Object Notation (JSON), Extensible Markup Language (XML), etc.).

Figure 4A:
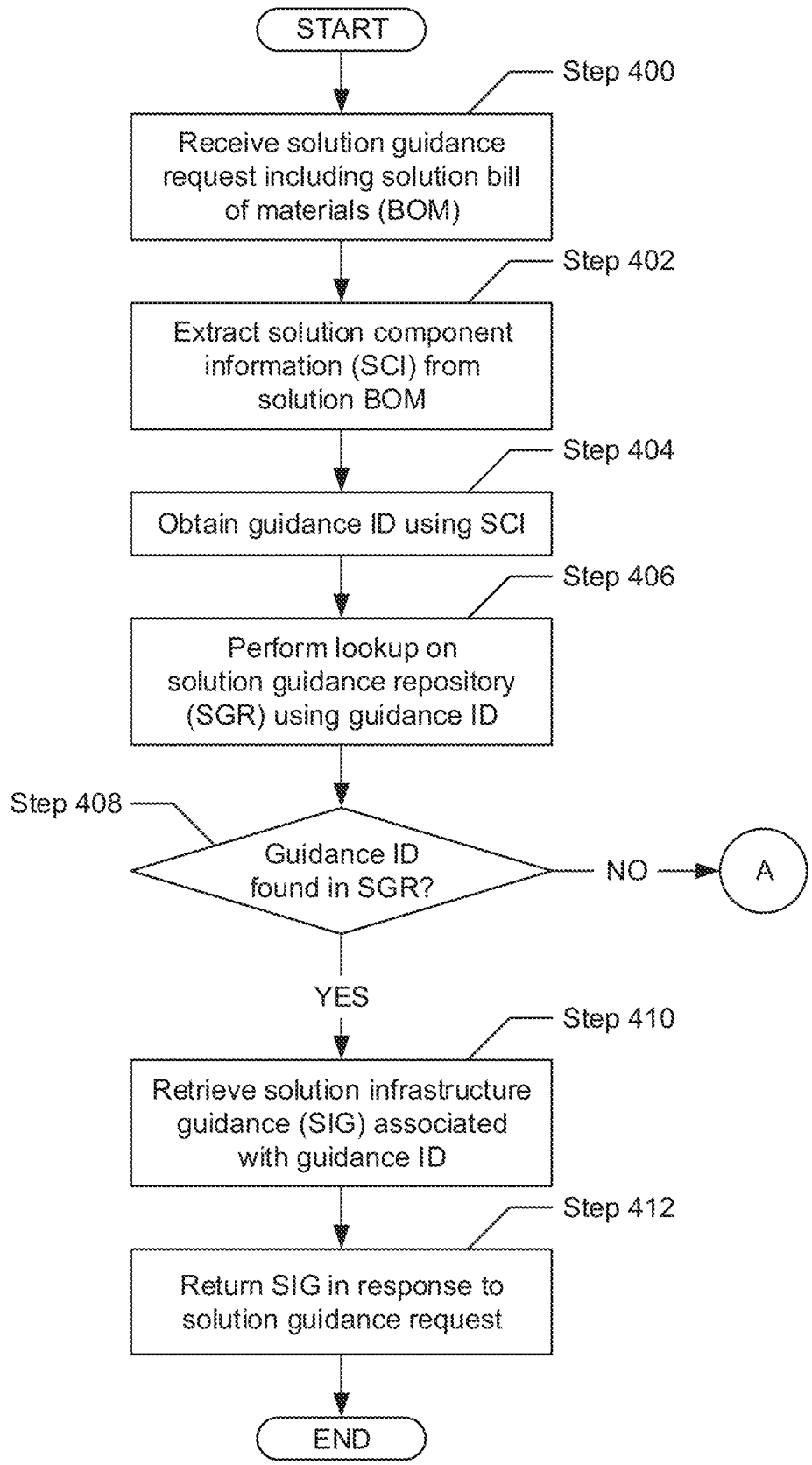
FIGS. 4A and 4B show flowcharts describing a method for processing solution guidance requests in accordance with one or more embodiments of the invention.
Figure 4B:
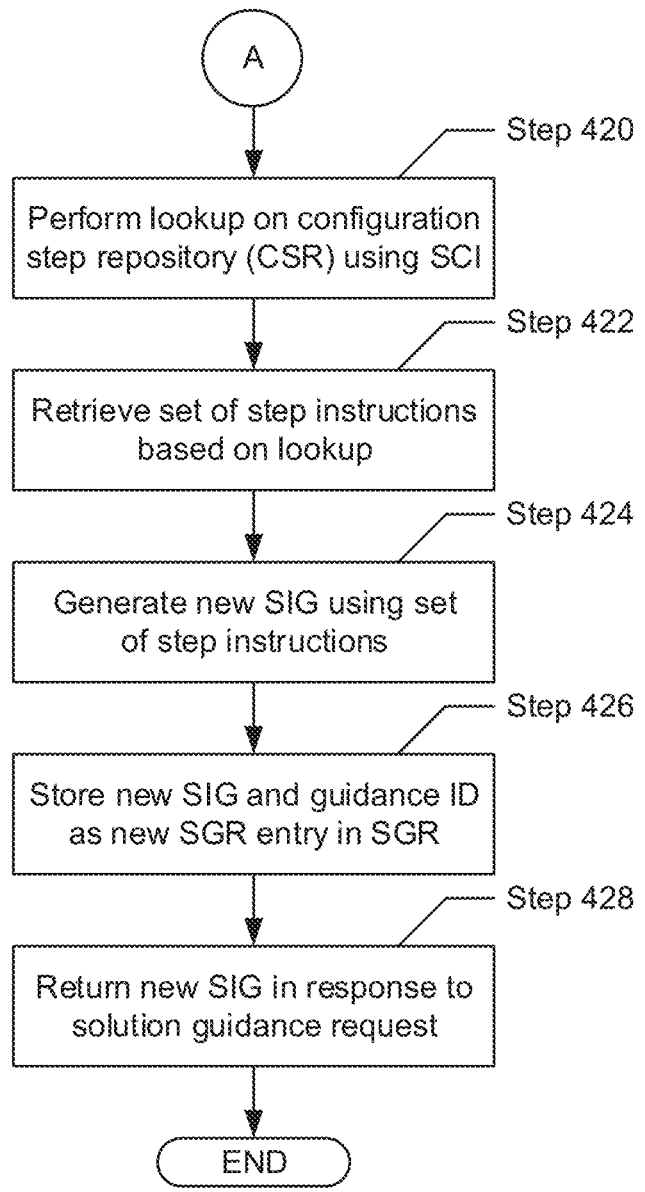

FIGS. 4A and 4B show flowcharts describing a method for processing solution guidance requests in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 4A, in Step 400, a solution guidance request is received. In one embodiment of the invention, the solution guidance request may have been submitted by a guidance requesting entity (GRE) (see e.g., FIG. 1). Further, the solution guidance request may specify a solution bill of materials (BOM). A solution BOM may be a data object or structure representative of a comprehensive list of all components and their respective subcomponents that constitute a solution/solution infrastructure. An example solution BOM is illustrated in FIG. 6B.

In Step 402, solution component information (SCI) is subsequently extracted from the solution BOM (received via the solution guidance request in Step 400). In one embodiment of the invention, SCI may pertain to pieces of information disclosed in the solution BOM that are directed specifically to one or more components and/or subcomponents of the solution infrastructure. By way of an example, SCI may entail the component IDs associated with the component(s), and the subcomponent IDs associated with the subcomponent(s), of the solution infrastructure. Other information that may exemplify SCI may include a targeted function or purpose (e.g., directed to compute, to management, to storage, etc.) of a component and/or subcomponent.

In Step 404, a guidance ID is obtained using the SCI (extracted in Step 402). In one embodiment of the invention, the guidance ID may be obtained by applying a hashing function to the SCI. A hashing function may be a cryptographic algorithm that maps data of any arbitrary size to a bit string of a fixed size. The bit string may be otherwise known as a hash, a hash value, a hash code, or a digest. For example, the guidance ID may be obtained by computing the hash of all component IDs and/or subcomponent IDs specified in the solution BOM (received in Step 400). Further, the returned hash (i.e., guidance ID) obtained after applying the hashing function is deterministic to the input data (i.e., the SCI). Subsequently, further to the example, the obtained guidance ID may be unique to the combination of components and/or subcomponents constituting a solution infrastructure.

In Step 406, a lookup is performed on the solution guidance repository (SGR) (see e.g., FIG. 1). As described above, the SGR may be a storage system or medium for consolidating deployment and/or operations guidance for one or more solution infrastructures. The SGR is described in further detail above with respect to FIG. 3C. Further, in one embodiment of the invention, the lookup may entail using the guidance ID (obtained in Step 404) to identify whether any previously generated solution infrastructure guidance (SIG) exists that pertains to a configuration of components and/or subcomponents that matches the configuration of the solution infrastructure for which guidance has been requested.

In Step 408, based on the lookup (performed in Step 406), a determination is made as to whether an existing (i.e., previously generated) SIG is stored in the SGR. Specifically, in one embodiment of the invention, the determination identifies whether the guidance ID (obtained in Step 404) matches the guidance ID specified in any SGR entry (see e.g., FIG. 3C) in the SGR. If it is determined that a comparable, previously generated (and stored) SIG is found in the SGR, then the process proceeds to Step 410. On the other hand, if it is alternatively determined that none of the previously generated (and stored) SIGs match the configuration of the solution infrastructure for which guidance has been requested, then the process proceeds to Step 420 (see e.g., FIG. 4B).

In Step 410, after determining (in Step 408) that the guidance ID (obtained in Step 404) matches a guidance ID specified in a SGR entry in the SGR, the existing SIG also specified in the SGR entry is retrieved. Substantively, in one embodiment of the invention, the existing SIG may be directed to a combination of components and/or subcomponents that matches the configuration of the solution infrastructure for which guidance has been requested. Further, the SIG may encompass various configuration steps directed to the one or more components and/or subcomponents of the solution infrastructure (specified in the solution BOM obtained in Step 400) which, further, span across one or more stages of a deployment and operations cycle (DOC).

In Step 412, the SIG (retrieved in Step 410) is returned, to the GRE, in response to the solution guidance request (received in Step 400). In one embodiment of the invention, prior to providing the SIG, the SIG may be encoded into one or more formats other than an initial data format (e.g., JSON) with which the SIG may originally be associated. Examples of the final formats, in which the SIG may be expressed, include but are not limited to: HyperText Markup Language (HTML), Adobe Portable Document Format (PDF), and Microsoft Word Open Extensible Markup Language (XML) Format Document (DOCX). Furthermore, in one embodiment of the invention, selection of which final format(s) that the SIG is to be encoded into may be specified as additional information enclosed within the solution guidance request (received in Step 400). In another embodiment of the invention, the aforementioned selection of final formats may be enabled through content encoding support for application programming interface (API) responses built into the API of the solution guidance platform (SGP).

Turning to FIG. 4B, in Step 420, after determining (in Step 408) that the guidance ID (obtained in Step 404) does not match the guidance ID specified in any SGR entry in the SGR, the auto-generation of a new SIG is triggered. Substantively, in one embodiment of the invention, a lookup may be performed on the configuration step repository (CSR) (see e.g., FIG. 1). As described above, the CSR may be a storage system or medium for consolidating configuration step instructions. The CSR is described in further detail above with respect to FIG. 3A. Further, in one embodiment of the invention, the lookup may entail using the SCI (extracted in Step 402) to identify the various configuration steps, spanning across all stages of a DOC (see e.g., FIG. 3B), that pertain to configuring the one or more components and/or subcomponents of the solution infrastructure for which guidance has been requested.

In Step 422, based on the lookup (performed in Step 420), one or more sets of step instructions (see e.g., FIG. 3A) are retrieved from the CSR. Specifically, in one embodiment of the invention, the SCI, which may encompass one or more component and/or subcomponent identifiers (IDs), may be used to identify/select the various CSR entries that specify any of the aforementioned component and/or subcomponent IDs. Thereafter, the step instructions (including their respective configuration dependencies (described above)) and the DOC stage ID, specified in each of the identified/selected CSR entries, may be obtained from therein.

In Step 424, a new SIG is generated using at least the set(s) of step instructions (retrieved in Step 422). In one embodiment of the invention, generation of the new SIG may entail ordering the various configuration steps (i.e., sets of step instructions) in view of the DOC stage, as well as the configuration dependencies, with which the configuration steps are associated. Furthermore, generation of the new SIG may also entail optimizing the guidance to ensure that step instructions, for similar components and/or subcomponents of the solution infrastructure, are not repeated.

In Step 426, a new SGR entry is created/added in the SGR. In one embodiment of the invention, the creation/addition of the new SGR entry may entail using the new SIG (generated in Step 424) and the guidance ID (obtained in Step 404). After creating/adding the new SGR entry, in Step 428, the new SIG (generated in Step 424) is returned, to the GRE, in response to the solution guidance request (received in Step 400). In one embodiment of the invention, prior to providing the new SIG, the new SIG may be encoded into one or more formats other than an initial data format (e.g., JSON) with which the new SIG may originally be associated. Examples of the final formats, in which the new SIG may be expressed, include but are not limited to: HyperText Markup Language (HTML), Adobe Portable Document Format (PDF), and Microsoft Word Open Extensible Markup Language (XML) Format Document (DOCX). Furthermore, in one embodiment of the invention, selection of which final format(s) that the new SIG is to be encoded into may be specified as additional information enclosed within the solution guidance request (received in Step 400). In another embodiment of the invention, the aforementioned selection of final formats may be enabled through content encoding support for application programming interface (API) responses built into the API of the solution guidance platform (SGP).

Figure 5:
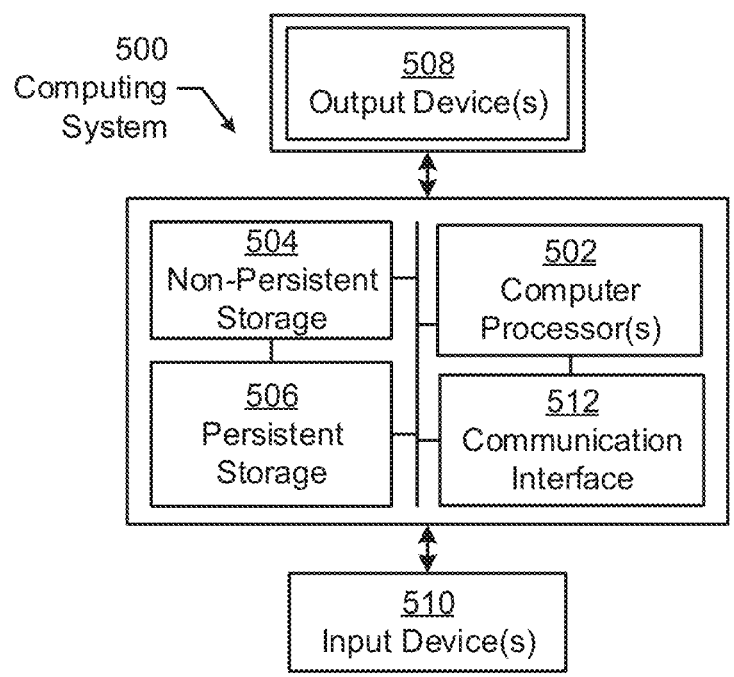
FIG. 5 shows a computing system in accordance with one or more embodiments of the invention.

FIG. 5 shows a computing system in accordance with one or more embodiments of the invention. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one embodiment of the invention, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

FIGS. 6A-6H show various aspects pertaining to an example in accordance with one or more embodiments of the invention. The following example, presented in conjunction with components shown in FIGS. 6A-6H, is for explanatory purposes only and not intended to limit the scope of the invention.

Turning to the example, assume a datacenter customer purchases a solution infrastructure tailored for a specific usage scenario. The solution infrastructure resembles the configuration portrayed in FIG. 6A. That is, the solution infrastructure (600) includes three component groups: Component Group C1 (602A), Component Group C2 (602B), and Component Group C3 (602C). Each component group is representative of a set of components, where each component group clusters the set of components based, for example, on model number and/or function. For this example, assume: Component Group C1 (602A) refers to a first set of servers representative of a management stack; Component Group C2 (602B) refers to a second set of servers representative of a compute stack; and Component Group C3 (603B) refers to a third set of servers representative of a storage stack.

As mentioned above, each component group is a set of one or more components. For simplicity, FIG. 6A only shows the set of components representative of Component Group C3 (602C), which include Component C3-1 (604A) and Component C3-2 (604B). Each component is representative of a physical device (e.g., server) that implements a function of the solution infrastructure (600). For this example, because Component Group C3 (602C) refers to a set of servers representative of a storage stack, assume: Component C3-1 (604A) is a first network attached storage (NAS); and Component C3-2 (604B) is a second NAS.

Moreover, each component may be further defined through the subcomponents residing therein. For simplicity, FIG. 6A only shows the set of subcomponents representative of Component C3-2 (604B), which include Subcomponent C3-2-1 (606A), Subcomponent C3-2-2 (606B), Subcomponent C3-2-3 (606C), and Subcomponent C3-2-4 (606D). As described above, each subcomponent of a component is representative of a physical and/or logical subassembly of that component. For this example, because Component C3-2 (604B) refers to a NAS, assume: Subcomponent C3-2-1 (606A) is a network interface controller (NIC); and each of Subcomponents C3-2-2 (606B), C3-2-3 (606C), and C3-2-4 (606D) is a hard disk drive (HDD).

Proceeding with the scenario, consider that the datacenter customer knows next to nothing about deploying (i.e., interconnecting, installing, and configuring) and/or operating (i.e., using, managing, and maintaining) their purchased solution infrastructure. Subsequently, as a guidance requesting entity (GRE), the datacenter customer submits a solution guidance request to the solution guidance platform (SGP). The solution guidance request includes a solution bill of materials (BOM) for the purchased solution infrastructure. An example solution BOM for the example solution infrastructure is portrayed in FIG. 6B. Substantively, a solution BOM is data object or structure representative of a comprehensive list of all components and their respective subcomponents that constitute a solution infrastructure. Based on this definition, the example solution BOM (620) is depicted as a table of various components and/or subcomponents of the purchased solution infrastructure (600). For this example solution BOM (620), each item line is directed to either a component (e.g., Component C1-1, Component C3-2) or a subcomponent (e.g., Subcomponent C1-1-1, Subcomponent C1-1-2, Subcomponent C3-2-1, etc.) of the solution infrastructure (600), and thus, also specifies the respective quantity of a particular component/subcomponent in the solution infrastructure, as well as the unique component/subcomponent ID (i.e., stock keeping unit (SKU)) associated with the particular component/subcomponent. One of ordinary skill will appreciate that additional or alternative information may be specified in a solution BOM.

After receiving the solution guidance request from the GRE (i.e., datacenter customer), the SGP may parse the included solution BOM to extract solution component information (SCI). The SCI may entail, but is not limited to, the various component and subcomponent IDs specified in the solution BOM. Using the obtained SCI, the SGP derives a guidance ID by applying a hashing function, where the input for the hashing function is all the component and subcomponent IDs representative of the SCI. A hash (i.e., guidance ID), deterministic of the combination of components and/or subcomponents in the solution infrastructure (600), is obtained. Subsequently, the guidance ID is used to perform a lookup on the solution guidance repository (SGR). The lookup may entail comparing the obtained guidance ID to guidance IDs specified in SGR entries of the SGR to determine whether any existing solution guidance, directed to the same combination of components and/or subcomponents of the purchased solution infrastructure (600), has been previously generated and catalogued. For this example, assume none of the SGR entries are found to specify the obtained guidance ID. Based on this determination, the auto-generation of a new solution guidance (i.e., solution infrastructure guidance (SIG)) is triggered.

Figure 6A:
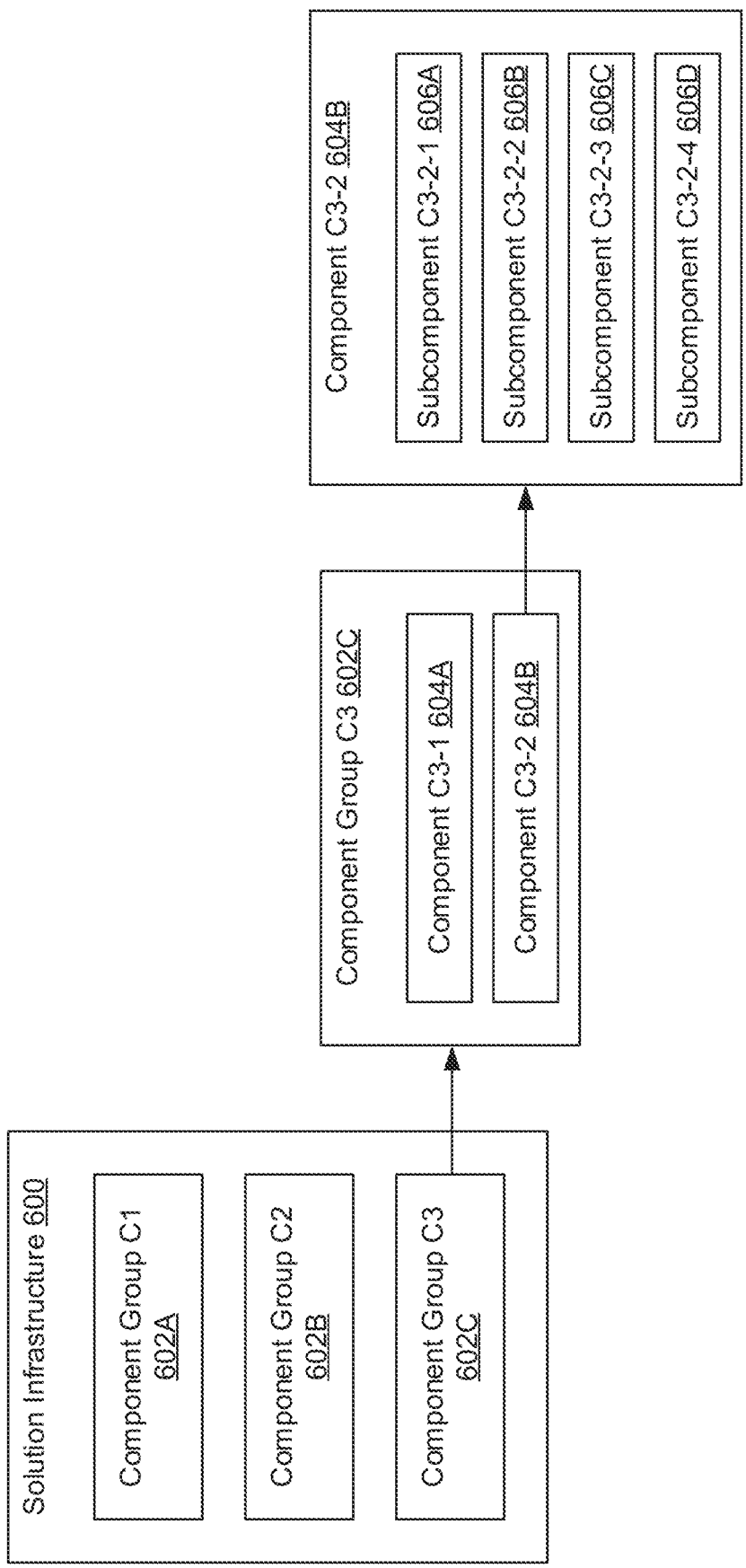
FIG. 6A shows an example solution infrastructure in accordance with one or more embodiments of the invention.
Figure 6D:
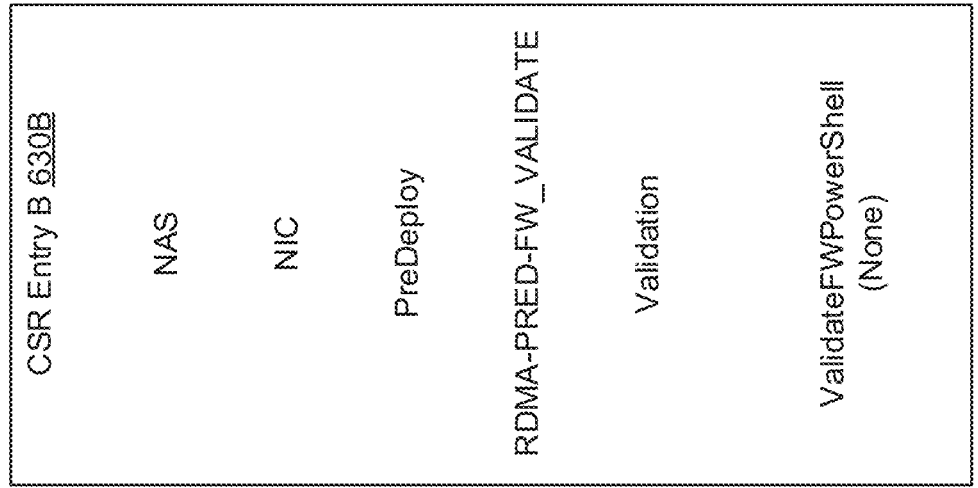
FIGS. 6C-6E show example configuration step repository entries in accordance with one or more embodiments of the invention.
Figure 6C:
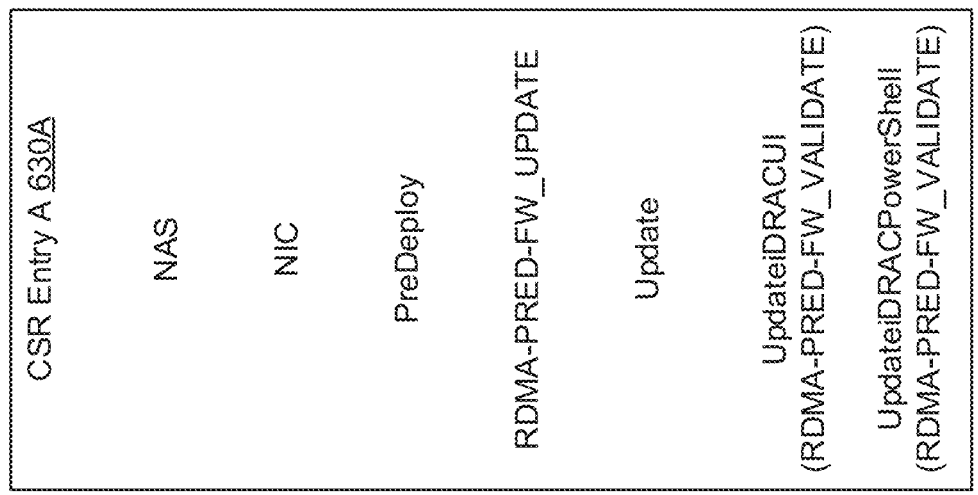
Figure 6E:
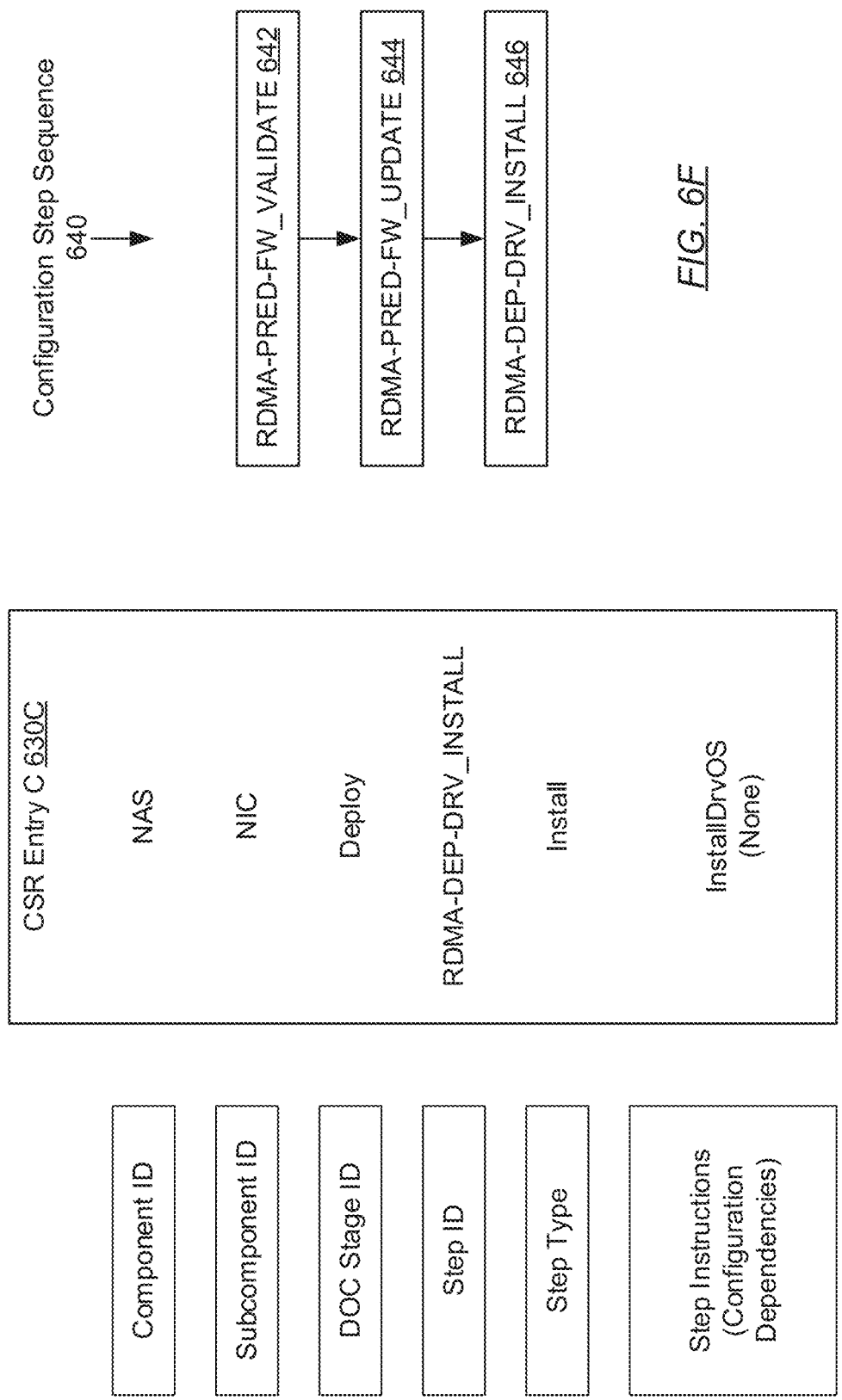

In triggering the auto-generation of a new SIG, the SGP uses the SCI obtained earlier to perform another lookup on the configuration step repository (CSR). The lookup may entail comparing the various component and/or subcomponent IDs (representative of the SCI) to component/subcomponent IDs specified in CSR entries of the CSR, thereby identifying the various configuration steps relevant to the purchased solution infrastructure (600). FIGS. 6C-6E show a few example CSR entries, pertaining to the NIC (i.e., Subcomponent C3-2-1 (606A) on the second NAS (i.e., Component C3-2 (604B)), that may have been found based on the lookup. Generally, the NIC may be a remote direct memory access (RDMA) network adapter. A first CSR Entry (630A) specifies the following information: (a) "NAS" as the Component ID; (b) "NIC" as the Subcomponent ID; (c) "PreDeploy" as the Deployment and Operations Cycle (DOC) Stage ID; (d) "RDMA-PRED-FW_UPDATE" as the Step ID; (e) "Update" as the Step Type; and (f) "UpdateiDRACUI" and "UpdateiDRACPowerShell" as references to the Step Instructions, which are each associated with Configuration Dependency "RDMA-PRED-FW_VALIDATE". Further, a second SCR Entry (630B)

specifies the following information: (a) "NAS" as the Component ID; (b) "NIC" as the Subcomponent ID; (c) "Pre-Deploy" as the DOC Stage ID; (d) "RDMA-PRED-FW_VALIDATE" as the Step ID; (e) "Validation" as the Step Type; and (f) "ValidateFWPowerShell" as a reference to the Step Instructions, which are not associated with any Configuration Dependencies. Moreover, a third SCR Entry (630C) specifies the following information: (a) "NAS" as the Component ID; (b) "NIC" as the Subcomponent ID; (c) "Deploy" as the DOC Stage ID; (d) "RDMA-DEP-DRV_INSTALL" as the Step ID; (e) "Install" as the Step Type; and (f) "InstallDrvOS" as a reference to the Step Instructions, which are not associated with any Configuration Dependencies.

After identifying the various CSR entries relevant to the purchased solution infrastructure (600), the SGP generates the new SIG by sequencing the identified configuration steps based on the DOC Stages and Configuration Dependencies associated with configuration steps. For the three example CSR Entries depicted in FIGS. 6C-6E, the configuration step sequence obtained, based on the specified DOC Stage IDs and Configuration Dependencies, if any, is portrayed in FIG. 6F. Substantively, the portrayed configuration step sequence (640) outlines: (a) that the first configuration step, associated with the Step ID "RDMA-PRED-FW_VALIDATE" (642), that should be performed is directed to validating the firmware version of the NIC (i.e., Subcomponent C3-2-1 (606A) of the solution infrastructure (600)); (b) that the second configuration step, associated with the Step ID "RDMA-PRED-FW_UPDATE" (644), that should be performed is directed to updating the firmware on NIC via the web user interface (UI) and tools; and (c) that the third configuration step, associated with the Step ID "RDMA-DEP-DRV_INSTALL", that should be performed is directed to installing the NIC device driver.

FIGS. 6G and 6H show an example SIG expressed in JSON. Proceeding with the example, after generating the new SIG, the new SIG may be encoded into another data format (e.g., HTML, PDF, DOCX, etc.), which the GRE may have selected. Thereafter, the SGP returns the new SIG to the GRE (i.e., datacenter customer) as a response to the solution guidance request submitted earlier.

Embodiments of the invention relate to a method and system for dynamic auto-generation of up-to-date deployment and operations guidance for solutions. Specifically, one or more embodiments of the invention address the taxing problem of configuring tailored solution infrastructures. At present, existing instructions (or guidance) provided for the configuration of solution infrastructures are overly complex, generic, and lack DOC stage and/or dependency considerations. Subsequently, existing guidance places much of the burden of properly configuring their respective solution infrastructures on the customers, administrators, and/or users, which can be time-consuming and error prone. Therefore, embodiments of the invention overcome these deficiencies exhibited in existing guidance to improve and optimize the user experience pertaining to deployment and/or operations configuration of solution infrastructures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing solution guidance, comprising:
receiving, by a solution guidance platform (SGP) comprising a processor, a first solution guidance request comprising a first solution bill of materials (BOM) for a first solution infrastructure;
extracting first solution component information (SCI) from at least a portion of the first solution BOM;
obtaining a first guidance identifier (ID) using the first SCI, wherein obtaining the first guidance ID comprises applying a hashing function to the first SCI;
performing, using the first guidance ID, a first lookup on a solution guidance repository (SGR) to determine that none of a set of existing SGR entries comprises the first guidance ID; and
auto-generating, based on the first lookup, solution guidance appropriate for the first solution infrastructure, wherein the solution guidance comprises deployment guidance and operations guidance for the first solution infrastructure, and
returning, in response to the first solution guidance request, the solution guidance.

2. The method of claim 1, wherein the first SCI comprises a set of component IDs and a set of subcomponent IDs for each component ID of the set of component IDs, wherein each component ID is associated with a physical device implementing the first solution infrastructure, wherein each subcomponent ID for a component ID is associated with a subassembly of the physical device.

3. The method of claim 1, wherein the auto-generation of solution guidance appropriate for the first solution infrastructure, comprises:
performing, using the first SCI, a second lookup on a configuration step repository (CSR) to identify a plurality of CSR entries, wherein each CSR entry of the plurality of CSR entries comprises at least a portion of the first SCI and a set of step instructions representative of a configuration step;
retrieving, based on the second lookup and for each CSR entry of the plurality of CSR entries, the set of step instructions specified therein to obtain a set of configuration steps;
generating, for the first solution infrastructure, a new solution infrastructure guidance (SIG) using at least the set of configuration steps; and
returning, in response to the first solution guidance request, the new SIG.

4. The method of claim 3, wherein a subset of the set of configuration steps is associated with at least one configuration dependency, wherein generating the new SIG comprises sequencing the set of configuration steps based on the at least one configuration dependency.

5. The method of claim 4, wherein each configuration step is further represented through a deployment and operations cycle (DOC) stage ID associated with a DOC stage, wherein generating the new SIG further comprises sequencing the set of configuration steps based on the DOC stage associated with each configuration step.

6. The method of claim 3, wherein the new SIG is expressed using JavaScript Object Notation (JSON).

7. The method of claim 1, further comprising:
receiving a second solution guidance request comprising a second solution BOM for a second solution infrastructure;
extracting second SCI from at least a portion of the second solution BOM;

obtaining a second guidance ID using the second SCI;

performing, using the second guidance ID, a second lookup on the SGR to identify an existing SGR entry, wherein the existing SGR entry comprises the second guidance ID and an existing solution infrastructure guidance (SIG);

retrieving, based on the second lookup, the existing SIG; and returning, in response to the second solution guidance request, the existing SIG.

8. A system, comprising:

a solution guidance repository (SGR) comprising a first processor; and a query service (QS) of a solution guidance platform (SGP) comprising a second processor operatively connected to the SGR, and programmed to:

receive solution component information (SCI);

derive a guidance identifier (ID) using the SCI, wherein obtaining the guidance ID comprises applying a hashing function to the SCI;

perform, using the guidance ID, a lookup on the SGR to determine that none of a set of existing SGR entries comprises the guidance ID; and auto-generating, based on the lookup, solution guidance appropriate for a solution infrastructure, wherein the solution guidance comprises deployment guidance and operations guidance for the solution infrastructure.

9. The system of claim 8, wherein the solution guidance platform (SGP) comprises the QS, an aggregation service (AS), a correlation service (CS), a visualization service (VS), and an application programming interface (API).

10. The system of claim 9, further comprising:

a configuration step repository (CSR) operatively connected to the CS.

11. The system of claim 9, further comprising:

a guidance requesting entity (GRE) operatively connected to the SGP.

12. A non-transitory computer readable medium (CRM) comprising computer readable program code, which when executed by a computer processor, enables the computer processor to:

receive a first solution guidance request comprising a first solution bill of materials (BOM) for a first solution infrastructure;

extract first solution component information (SCI) from at least a portion of the first solution BOM;

obtain a first guidance identifier (ID) using the first SCI, wherein obtaining the first guidance ID comprises applying a hashing function to the first SCI;

perform, using the first guidance ID, a first lookup on a solution guidance repository (SGR) to determine that none of a set of existing SGR entries comprises the first guidance ID; and auto-generating, based on the first lookup, solution guidance appropriate for the first solution infrastructure, wherein the solution guidance comprises deployment guidance and operations guidance for the first solution infrastructure.

13. The non-transitory CRM of claim 12, wherein the first SCI comprises a set of component IDs and a set of subcomponent IDs for each component ID of the set of component IDs, wherein each component ID is associated with a physical device implementing the first solution infrastructure, wherein each subcomponent ID for a component ID is associated with a subassembly of the physical device.

14. The non-transitory CRM of claim 12, wherein to auto-generate solution guidance appropriate for the first solution infrastructure, the computer readable program code, which when executed by the computer processor, enables the computer processor to:

perform, using the first SCI, a second lookup on a configuration step repository (CSR) to identify a plurality of CSR entries, wherein each CSR entry of the plurality of CSR entries comprises at least a portion of the first SCI and a set of step instructions representative of a configuration step;

retrieve, based on the second lookup and for each CSR entry of the plurality of CSR entries, the set of step instructions specified therein to obtain a set of configuration steps;

generate, for the first solution infrastructure, a new solution infrastructure guidance (SIG) using at least the set of configuration steps; and return, in response to the first solution guidance request, the new SIG.

15. The non-transitory CRM of claim 14, wherein a subset of the set of configuration steps is associated with at least one configuration dependency, wherein generating the new SIG comprises sequencing the set of configuration steps based on the at least one configuration dependency.

16. The non-transitory CRM of claim 15, wherein each configuration step is further represented through a deployment and operations cycle (DOC) stage ID associated with a DOC stage, wherein generating the new SIG further comprises sequencing the set of configuration steps based on the DOC stage associated with each configuration step.

17. The non-transitory CRM of claim 14, wherein the new SIG is expressed using JavaScript Object Notation (JSON).

18. The non-transitory CRM of claim 12, further comprising computer readable program code, which when executed by the computer processor, enables the computer processor to:

receive a second solution guidance request comprising a second solution BOM for a second solution infrastructure;

extract second SCI from at least a portion of the second solution BOM;

obtain a second guidance ID using the second SCI;

perform, using the second guidance ID, a second lookup on the SGR to identify an existing SGR entry, wherein the existing SGR entry comprises the second guidance ID and an existing solution infrastructure guidance (SIG);

retrieve, based on the second lookup, the existing SIG; and return, in response to the second solution guidance request, the existing SIG.

* * * * *